United States Patent [19]

Brinegar

[11] 3,841,492

[45] *Oct. 15, 1974

[54] PRODUCTION OF SEMIPERMEABLE POLYBENZIMIDAZOLE MEMBRANES

[75] Inventor: Willard C. Brinegar, Morris Township, N.J.

[73] Assignee: Celanese Corporation, New York, N.Y.

[ * ] Notice: The portion of the term of this patent subsequent to Mar. 13, 1990, has been disclaimed.

[22] Filed: June 29, 1973

[21] Appl. No.: 375,262

Related U.S. Application Data

[63] Continuation-in-part of Ser. No. 219,157, Jan. 19, 1972, abandoned, which is a continuation-in-part of Ser. No. 28,940, April 15, 1970, Pat. No. 3,720,607.

[52] U.S. Cl. .................. 210/500, 264/41, 264/216
[51] Int. Cl. ...................... B01d 39/16, B01d 31/00
[58] Field of Search ......... 210/23, 500; 264/41, 216

[56] References Cited
UNITED STATES PATENTS

| | | | |
|---|---|---|---|
| 3,439,074 | 4/1969 | Sharples et al. | 210/500 X |
| 3,526,588 | 9/1970 | Michaels et al. | 210/23 |
| 3,592,953 | 7/1971 | Ward et al. | 210/500 X |
| 3,615,024 | 10/1971 | Michaels | 210/500 X |
| 3,636,150 | 1/1972 | Rowley et al. | 210/500 X |
| 3,720,607 | 3/1973 | Brinegar | 210/23 |

Primary Examiner—Frank A. Spear, Jr.

[57] ABSTRACT

A process is provided for forming an improved reverse osmosis membrane of unusually high physical durability and chemical stability. The membrane is formed of the specific polybenzimidazole chemical structure indicated in the claims. In a preferred embodiment the membrane is formed of poly-2,2'-(m-phenylene)-5,5'-bibenzimidazole. The membrane is formed by (a) providing a solution of the polybenzimidazole polymer of the formula indicated, (b) depositing a film of the solution upon a support, (c) evaporating an amount of solvent from the film sufficient to allow the formation of a thin solid layer on the exposed surface of the film having a density which is substantially greater than that of the remaining portion of the film on which the solid layer of increased density is formed, and (d) washing the resulting film with a non-solvent for the polymer to remove residual solvent. The reverse osmosis membranes exhibit performance characteristics which are more highly resistant to deterioration upon the passage of time, are capable of operation at high pressures (e.g., 1,000 psi and up), are capable of operation at elevated temperatures (e.g., 100°C), and exhibit outstanding chemical stability.

21 Claims, No Drawings

PRODUCTION OF SEMIPERMEABLE POLYBENZIMIDAZOLE MEMBRANES

CROSS-REFERENCE TO RELATED APPLICATION

This application is a continuation-in-part of copending U.S. Ser. No. 219,157, filed Jan. 19, 1972, now abandoned, which is a continuation-in-part of U.S. Ser. No. 28,940, filed Apr. 15, 1970 (now U.S. Pat. No. 3,720,607).

BACKGROUND OF THE INVENTION

In recent years there has been increasing interest expressed in the development of microporous membranes of semipermeable nature which are useful in separating the components of a solution. For instance, semipermeable membranes have been looked to as a possible means to demineralize or purify otherwise unusable water and to thereby alleviate the increasing demands for potable water necessitated by the rapid growth of the population and industry in many parts of the world. Separation techniques which employ such membranes include electrodialysis, reverse osmosis, ultrafiltration, etc.

Electrodialysis separations employ an electrolytic cell having alternating anionic and cationic membranes that collect desalted and concentrated solutions in adjacent compartments. Such a technique can be useful to purify liquids by removing ionizable impurities, to concentrate solutions of electrolytes, or to separate electrolytes from non-electrolytes.

As opposed to the charge dependent types of separations, reverse osmosis utilizes pressure to move materials of extremely small dimensions which may be either ionic or non-ionic selectively through a membrane. Ultrafiltration is distinct from a reverse osmosis separation and uses gravity or applied pressure to effect a gross separation using membranes which act as submicronic sieves to retain large molecules and permit the passage of smaller forms.

The desalination of saline water (e.g., sea water) through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane, is for the solvent on the side of lower concentration to migrate through the membrane to the solution of higher concentration thereby eventually equilibrating the concentrations of the two-solutions. The degree of this natural tendency is measured in terms of osmotic pressure. The process may be reversed by applying a pressure to the side of higher concentration in excess of the osmotic pressure thereby forcing the solvent of the solution of higher concentration through the semipermeable membrane to the side of lower concentration thus bringing about a separation. The natural tendency, which is believed to be the result of a difference in free energy resulting from the concentration gradient, is observed to operate at a high thermodynamic efficiency, and at ambient temperature.

Semipermeable membranes proposed in the past have been formed from a variety of materials, and are characterized by the ability to allow one component (e.g., ions or molecules) of a solution to pass through the same to the substantial exclusion of other components (e.g., other ions or molecules). Examples of substances heretofore recognized to possess this property include cellophane (i.e., regenerated cellulose), cellulose esters (e.g., cellulose acetate, cellulose butyrate, etc.), animal or protein membranes, polyelectrolyte complexes, ethyl cellulose, cross-linked polyacrylates, etc. U.S. Pat. No. 3,526,588 to Michaels at Col. 3, lines 27–28 includes a passing reference to the possibility of utilizing undesignated polybenzimidazoles in a specific ultrafiltration separation involving macromolecular mixtures of polyvinylpyrrolidone.

The semipermeable membranes of the prior art generally are of limited applicability in many separatory processes because of inherent disadvantages relating to their chemical stability, strength, thermal stability, efficiency, length of life, and cost. Generally, the prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling it. Furthermore, some membranes exhibit a decided decrease in efficiency with increase in temperature or pressure thereby limiting their range of applicability. Solvent susceptibility may be another factor affecting the applicability of a particular porous membrane to a separation process. Additionally, semipermeable membranes may be inappropriate for a particular application due to low solute rejection values or low flux.

Other factors which render the semipermeable membranes of the prior art of limited usefulness in reverse osmosis separatory processes include their limited strength and chemical resistance and extremely short operating lives at high pressures and temperatures. Low strength properties have generally been manifest in the form of the inability of the prior art films to operate at pressures in excess of about 1,000 psi or to operate at lower pressures for extended periods of time, especially at temperatures in excess of about 50°C. The use of such high pressures is quite desirable in order to increase the speed of reverse osmosis, particularly the speed at which desalinized water is formed. However, when such high pressures have been employed operating efficiency, (i.e., in reverse osmosis desalinization, and the degree of salt removal from saline solutions) has significantly decreased. With the use of pulsating pumps in reverse osmosis separatory operations the presence of rapid increases and decreases in the pressure applied to the reverse osmosis membrane has caused even greater problems when the use of prior art membranes has been attempted. Furthermore, in general commercial usages it is necessary that membranes be strong enough to withstand shipment, storage and general rough handling. Thus, the continued need to replace the prior art membranes due to mechanical failures has greatly limited their commercial usefulness.

The chemical resistance properties of the prior art separatory membranes have been their greatest shortcoming. Although the separation of solutions comprising only sodium chloride and water presents few chemical resistance problems to the prior art membranes, such pure solutions are rarely found. Many naturally occurring saline solutions contain materials which exhibit a degrading effect on previously known reverse osmosis membranes. For example, cellulose acetate and amide linked polymers, such as those disclosed in U.S. Pat. No. 3,597,632, are subject to either base or acid catalyzed hydrolysis even in weakly basic or acidic solutions. Other compounds which may exhibit a degrading effect on the prior art membranes include formic acid, acetone and bisulfite ions.

Finally, many of the prior art semipermeable membranes are limited in their usefulness because of the low temperatures at which separatory operations must occur. Higher temperatures (e.g., those in excess of about 50°C.) have resulted in reduced salt removal efficiency, particularly when extended operating times have been employed.

Representative cellulose acetate membranes, which may be utilized in desalination processes are disclosed in U.S. Pat. No. 3,133,132 to Loeb et al. The Loeb et al. patent also discloses a process for preparing semipermeable membranes involving the casting of a cellulose acetate solution containing a pore producing agent (i.e., an agent which produces a structure which allows an appreciable rate of passage of fresh water under suitable conditions). It has been found, however, that cellulose acetate membranes described therein must be utilized under relatively mild conditions and may not satisfactorily be utilized at elevated temperatures (i.e., in excess of 70° to 80°C.). Upon continuous exposure to salt water such cellulose acetate membranes tend to undergo hydrolysis and become less effective for their intended purpose. Also, such membranes may be damaged by contact with a variety of solvents (e.g., phenol, acetone, methyl ethyl ketone, sodium hydroxide solutions, mineral acid solutions), or by bacteriological attack.

Certain amide-containing membranes of low moisture absorption which may be utilized in desalination processes are disclosed in U.S. Pat. No. 3,567,632 to Richter et al. This patent discloses reverse osmosis desalination membranes prepared from a class of specifically identified and specifically limited nitrogen-linked aromatic polymers. These membranes optionally may include certain polybenzimidazole linkages together with the other units indicated within the polymer chain.

These membranes, however, still exhibit many of the disadvantages previously noted for prior art semipermeable membranes and are therefore of limited usefulness. Although the Richter et al amide-linked polymer membranes may be operated at somewhat higher temperatures and possess greater strength than, for example, cellulose acetate membranes, the relative increases are still less than are commercially desirable. Generally the useful life of such membranes at pressures in excess of about 300 to 400 psi is limited to about 1 to 3 months. After this period of operation both salt rejection percentage (in aqueous saline solutions) and desalinized water preparation speed has significantly decreased. Finally, these membranes are of limited chemical resistance, especially in view of their susceptability to aqueous hydrolysis in the presence of bases or acids.

The applicability of a particular membrane to the separation of components from solutions via reverse osmosis appears to depend on both the physical nature of the semipermeable structure and the particular chemical structure of the membrane. It should be noted here that, in accordance with common usage, the terms microporous and semipermeable or permeable will be used interchangeably to denote the character or quality of the membrane which is necessary to render the membrane suitable for the use herein intended. Furthermore, the term membrane will be used to describe membranes whether prepared as a flat film, or as a hollow fiber.

More specifically, the membranes described herein are characterized by the fact that they allow one or more components of a solution to pass through them via reverse osmosis while they prevent the passage of one or more other components.

It is an object of the invention to provide processes for the production of improved reverse osmosis polybenzimidazole membranes.

It is an object of the invention to provide improved reverse osmosis polybenzimidazole membranes which may be utilized to separate components of a solution.

It is an object of the invention to provide improved reverse osmosis polybenzimidazole membranes possessing enhanced chemical and thermal stability.

It is another object of the invention to provide improved reverse osmosis polybenizmidazole membranes of enhanced solvent resistance.

These and other objects as well as the scope, nature and utilization of this invention will be apparent from the following description and appended claims.

Summary of the Invention

It has been found that a process for producing an improved reverse osmosis membrane of unusually high physical durability and chemical stability comprises:

a. providing a solution of a polybenzimidazole polymer consisting essentially of recurring units of the formula:

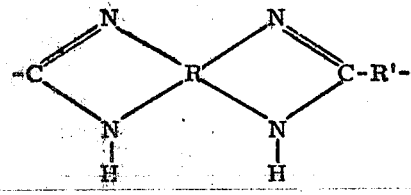

wherein R is a tetravelent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran, in a solvent capable of dissolving the polymer, b. depositing a film of the solution upon a support, c. evaporating an amount of solvent from the film sufficient to allow the formation of a thin solid layer on the exposed surface of the film having a density which is substantially greater than that of the remaining portion of the film on which the solid layer of increased density is formed, and d. washing the resulting film with a non-solvent for the polymer to remove residual solvent thereby producing a semipermeable membrane suitable for a reverse osmosis separation.

The improved reverse osmosis polybenzimidazole membrane of the present invention exhibits an unusually high physical durability and chemical stability and consists essentially of recurring units of the formula:

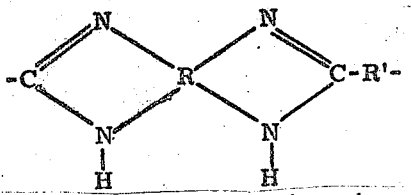

wherein R is a tetravelant aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran, and wherein said polybenzimidazole has an inherent viscosity in 97.0 percent sulfuric acid at 25°C. of at least about 0.4.

Surprisingly, it has now been found that by utilizing the specific polybenzimidazole polymer described herein it is possible to prepare reverse osmosis membranes which have increased strength properties, improved chemical resistance, longer operating lives at increased pressures and temperatures, and which are operable utilizing either side of the membrane. While the prior art has taught that it is desirable to use polymeric membranes which have low moisture absorption, when strength and chemical resistance properties are sought, the polymers of this invention exhibit extremely high moisture regain in addition to improved chemical and strength properties.

Whether flat film or hollow fiber membranes are utilized in the instant invention, the basic process is still the same. It generally involves contacting one side of the particular polybenzimidazole membrane with the liquid upon which the reverse osmosis operation is to be applied, and recovering from the other side of said membrane a liquid which passes through the membrane and which contains a reduced amount of one component of the initial liquid mixture or solution.

The reverse osmosis membranes of the instant invention exhibit unique and unexpected properties which distinguish them over the prior art reverse osmosis membranes. Utilizing the membranes of the instant invention either in the form of a flat film or in the form of a hollow filament, it is possible to carry out reverse osmosis operations such as the desalination of salt water at much higher operating temperatures than were previously possible using the reverse osmosis membranes described in the prior art. For example, it is possible routinely to carry out reverse osmosis utilizing the membranes of the instant invention at temperatures as high as 75° to 80°C. Furthermore, the membranes of the instant invention exhibit significantly increased strength properties when compared to the membranes of the prior art. This increase in strength allows the utilization of the instant membranes for longer periods of time at increased pressures and temperatures and thus enables more efficient, speedier reverse osmosis operations. Moreover, utilizing the instant membranes commercially feasible reverse osmosis units may be prepared which can be transported, stored, installed and operated without the concern previously noted for the durability of the membrane itself.

The membranes of the instant invention, contrary to some membranes proposed and utilized in the prior art, can be operated using either side of the membrane. Thus, for example, it would be possible to use a membrane for a time in one direction and then switch the direction of flow in the membrane, thereby cleaning the previously used side of the membrane. The membrane could then be operated in this direction until it was desirable again to switch operating sides. Finally, and most important of all, the reverse osmosis membranes of the instant invention, whether used in the form of a flat film or a hollow fiber, exhibit significant increases in chemical resistance properties over all prior art reverse osmosis membranes. While the amide-linked reverse osmosis membranes of the prior art (i.e., those generally contended to be the most chemically resistant) are subject to base and acid catalized aqueous hydrolysis, bisulfite attack and solvation by formic acid, and are therefore limited in their useful life when thusly employed, there is no such limiting factor with the reverse osmosis membranes of the present invention. In fact, the reverse osmosis membranes of the present invention are practically inert chemically and therefore can be used in varied reverse osmosis separation systems without chemical attack or solvation.

DESCRIPTION OF PREFERRED EMBODIMENTS

The Starting Polymer

The polymeric material utilized to form the semipermeable membranes of the present invention is a linear polybenzimidazole. Typical polymers of this class and their preparation are more fully described in U.S. Pat. No. 2,895,948, U.S. Pat. No. Re. 26,065, and in the Journal of Polymer Science, Vol. 50, pages 511–539, (1961) which are herein incorporated by reference. The polybenzimidazoles consist essentially of recurring units of the following Formulas I and II.
Formula I is:

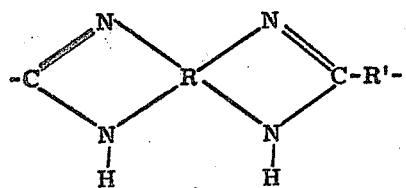

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran.
Formula II is:

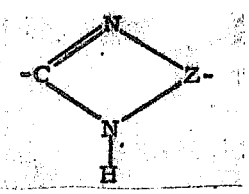

wherein Z is an aromatic nucleus having the nitrogen atoms forming the benzimidazole ring paired upon adjacent carbon atoms of the aromatic nucleus.

Preferably, aromatic polybenzimidazoles are selected, e.g., polymers consist essentially of the recurring units of Formulas I and II wherein R' is an aromatic ring or a heterocyclic ring.

As set forth in U.S. Pat. No. Re 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents of the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

Poly-2,2'-(m-phenylene)-5,5'-bibenzimidazole;
Poly-2,2'-(pyridylene-3",5")-5,5'-bibenzimidazole;
Poly-2,2'-(furylene-2",5")-5,5'-bibenzimidazole;
Poly-2,2'-(naphthalene-1",6")-5,5'-bibenzimidazole;
Poly-2,2'-(biphenylene-4",4''')-5,5'-bibenzimidazole;
Poly-2,2'-amylene-5,5'-bibenzimidazole;
Poly-2,2'-octamethylene-5,5'-bibenzimidazole;
Poly-2,6-(m-phenylene)-diimidazobenzene;
Poly-2,2'-cyclohexeneyl-5,5'-bibenzimidazole;
Poly-2,2'(m-phenylene)-5,5'-di(benzimidazole) ether;
Poly-2,2'(m-phenylene)-5,5'-di(benzimidazole)sulfide;
Poly-2,2'(m-phenylene)-5,5'-di(benzimidazole) sulfone;
Poly-2,2'(m-phenylene)-5,5'-di(benzimidazole) methane;
Poly-2',2''(m-phenylene)-5',5''di(benzimidazole) propane-2,2; and
Poly-2',2''(m-phenylene)-5',5'' di(benzimidazole) ethylene-1, where the double bonds of the ethylene groups are intact in the final polymer.

The preferred polybenzimidazole for use in the present process is one prepared from poly-2,2'-(m-phenylene)-5,5'-bibenzimidazole the recurring unit of which is:

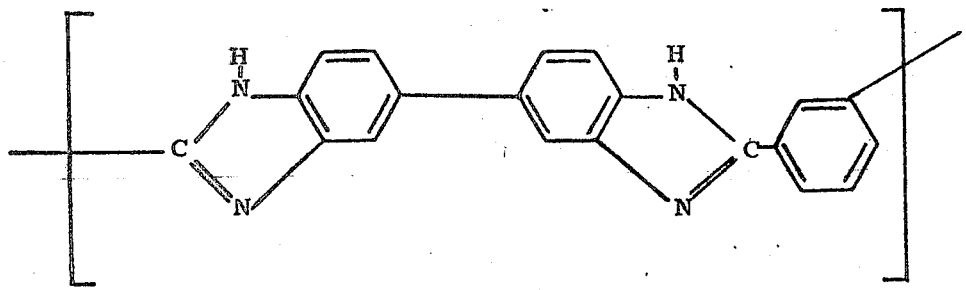

Any polymerization process known to those skilled in the art may be employed to prepare the polybenzimidazole which is utilized to form membranes in accordance with the present invention. With respect to aromatic polybenzimidazoles, preferably, equimolar quantities of the monomeric tetramine and dicarboxyl compound may be introduced into a first stage melt polymerization reaction zone and heated therein at a temperature above about 200°C., preferably at least 250°C., and more preferably from about 240° to 300°C. The reaction is conducted in a substantially oxygen-free atmosphere, (i.e., below about 20 ppm oxygen and preferably below about 8 ppm oxygen), until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 ml. of 97 percent $H_2SO_4$ at 25°C.).

After the conclusion of the first stage reaction, which normally takes at least 0.5 hours and preferably 1 to 3 hours, the foamed prepolymer is cooled and then powered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, (e.g., 0.8 to 1.1 or more.). When the polybenzimidazole polymer is to be utilized in the form of a hollow fiber its preferred inherent viscosity is at least about 0.5, most preferably in the range of about 0.7 to about 1.4.

The temperature employed in the second stage is at least 250°C., preferably at least 325°C., and more preferably from about 350° to 425°C. The second stage reaction generally takes at least 0.5 hours, and preferably from about 1 to 4 hours or more. It is of course also possible to prepare the instant polymers via a one-step reaction, however, the previously described two-step process is preferred.

The Polymer Solution

The solvents utilized to form the polybenzimidazole polymer solutions include those solvents which are commonly recognized as being capable of dissolving the particular polybenzimidazole polymer. For instance, the solvents may be selected from those commonly utilized in the formation of polybenzimidazole One suitable means for dissolving the polymer in the solvent is by mixing the materials at a temperature about the normal boiling point of the solvent, for example, about 25° to 120°C. above such boiling point, and at a pressure of 2 to 15 atmospheres for a period of 1 to 5 hours. The resulting solutions then preferably are filtered to remove any undissolved polymer. A minor amount of lithium chloride optionally may be provided in the spinning solution in accordance with the teachings of commonly assigned U.S. Pat. No. 3,502,606. The lithium chloride serves the function of preventing the polybenzimidazole polymer from phasing out of the solution upon standing for extended periods of time.

Semipermeable Flat Film Membrane Formation

The solution of polybenzimidazole polymer is deposited upon a support to form a wet film of the same. The nature of the support is not critical and may be selected from a variety of materials including ceramic, glass, or metallic plates (e.g., stainless steel). The support is preferably provided with retaining sides, or raised edges, whereby the solution is confined to the surface thereof at the desired location until its consistency is such that retaining sides are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade optionally may be drawn over the surface of the wet film to aid the deposition of a wet film of uniform thickness. In a preferred embodiment of the invention, the solution is deposited by the utilization of a doctor blade caster.

The thickness of the wet film deposited upon the support is influenced by the desired thickness of the polybenzimidazole semipermeable membrane ultimately to be produced. Commonly the wet film is deposited upon the support in a substantially uniform thickness of about 1 to 30 mils and preferably 2 to 10 mils. In a particularly preferred embodiment of the invention, the wet film is deposited in a thickness of about 4 to 8 mils.

A quantity of solvent is next evaporated from the exposed surface of the wet film to allow the formation of a relatively thin solid layer on the exposed surface of the same. The thin solid film commonly exhibits a thickness of about 0.01 to 20 microns, and preferably about 1 to 10 microns. During the formation of the solid layer on the exposed surface of the film, the solvent present near the surface of the wet film is flashed off and a thin coagulated solid layer or skin of polybenzimidazole polymer remains. The remaining portion of wet film supports the solid layer remains essentially unchanged while the solid layer is formed. The solid layer accordingly exhibits a density which is substantially greater than that of the remaining portion of the film which has not undergone coagulation and continues to possess a liquid consistency.

The evaporation of solvent from the exposed surface of the wet film may be accomplished by a variety of techniques as will be apparent to those skilled in the art. For instance, a stream of air or other gas at ambient or at an elevated temperature (e.g., approaching the boiling point of the solvent) may be simply directed at the exposed surface of the wet film. Alternatively, the wet film may be simply allowed to stand in an uncirculated gaseous environment wherein the requisite degree of solvent evaporation is accomplished. In a further embodiment of the invention, the gaseous atmosphere to which the wet film is exposed may be at reduced pressure, (e.g., 100 mm. of Hg. up to near atmospheric pressure). It will be apparent to those skilled in the art that the rate at which the solvent is evaporated increases with the temperature of the gaseous atmosphere impinging upon the wet film, the flow rate of the gaseous atmosphere, and with reduced pressure. The time required to form the desired thin solid layer upon the exposed surface of the wet film commonly ranges from about 5 seconds to 30 minutes, and preferably from about 15 seconds to 5 minutes. In a preferred embodiment of the invention the wet film is exposed to a stream of circulating air at ambient temperature (e.g., 25°C.) and pressure for about 1 to 5 minutes. When the air is not circulated, longer exposure times advantageously may be employed.

The resulting film bearing a thin solid layer upon its surface is next converted to a semipermeable membrane suitable for separating components of a solution by washing the same with a non-solvent for the polybenzimidazole polymer which is capable of removing residual quantities of the polybenzimidazole solvent. During the wash step, the remaining polybenzimidazole polymer within the wet film is coagulated while the solvent which originally dissolved the same is removed. The wash medium is preferably aqueous in nature, and is most preferably water. The wash step is preferably carried out by immersing the film in the wash medium. Alternatively, any other convenient means for contacting the film with the wash medium may be utilized, such as by spraying the film with the same. In a preferred embodiment of the invention a water wash medium is provided at a relatively cool temperature, (e.g., at about 5° to 30°C.) and at a temperature of about 10° to 25°C. in a particularly preferred embodiment. The time required to accomplish coagulation of the remaining polybenzimidazole polymer and the substantial removal of residual solvent from the same varies with the temperature of the wash medium. The removal of residual solvent usually requires at least about 30 seconds in contact with the wash medium. Satisfactory wash times commonly range from about 30 seconds to 20 minutes, and preferably about 2 to 5 minutes. Considerably longer wash times may be employed, but generally with no commensurate advantage.

The resulting flat film membranes formed of polybenzimidazole polymer consist of an outer relatively thin surface layer formed during the evaporation step adjacent to a relatively thin layer of a more porous structure formed during the wash step. It is believed that the denser relatively thin outer layer is primarily responsible for the ability described hereafter of the resulting membranes to effect the separation of the components of a solution via reverse osmosis, and that the remaining more porous portion of the membrane serves primarily a supporting function. The membranes are characterized by high thermal stability and can withstand temperatures during use in excess of 125°C. Also, the membranes exhibit a high degree of chemical stability, and can continue to function in spite of contact with a wide variety of reagents and solvents.

Prior to its use it is preferable that the flat membrane be subjected to an annealing step using the techniques of commonly assigned U.S. Pat. No. 3,699,038, and as further described in U.S. Pat. Ser. No. 219,576, filed Jan. 20, 1972, now U.S. Pat. No. 3,737,042. Generally this annealing technique involves the exposure of the fiber for about 30 seconds to 20 minutes and at about 80° to 300°C. to an organic liquid, such as ethylene glycol, which is a non-solvent for the polybenzimidazole polymer and is preferably water miscible.

Semipermeable Hollow Fil Membrane Formation

Membranes formed of either a single, or, for utility's sake, a plurality of the parallel polybenzimidazole hollow fibers also find utility in the instant invention. These filaments can be prepared by solution spinning using a dope of the polybenzimidazole polymer. Suitable solvents for the preparation of this dope include those solvents which are commonly recognized as capable of dissolving the particular polybenzimidazole polymer, such as those solvents used in preparing the polymer solution for film preparation as described above. Particularly preferred is a solvent system comprising N,N-dimethyl acetamide and lithium chloride.

Using conventional equipment and techniques the dope is placed in an extrusion or spinning bomb at the desired solids level. The extrusion solids of course are dependent upon the viscosity and molecular weight of the particular polybenzimidazole polymer used. However, using N,N-dimethyl acetamide and lithium chloride as a solvent system, solids in the range of about 20 to 30 weight percent are typical. In selecting the solids to be used it is desirable to use a dope having the highest possible viscosity which can still be extruded at the desired extrusion temperature. Extrusion temperatures generally range from about room temperature or slightly lower to as high as 100° to 150°C.

The bomb containing the spinning dope is attached to the spinneret and pressurized with sufficient pressure to cause the polymer solution contained in the bomb to escape through the spinneret jet. It is of course understood that in order to prepare optimum hollow filaments the dope placed in the bomb should be filtered either prior to placing it in the bomb or just prior to spinning. The spinneret or nozzle through which the hollow filaments are spun comprises an inner nozzle and a concentric nozzle arranged about the inner nozzle. In order to maintain the hollow configuration of spun fibers a fluid, either gaseous or liquid, is forced through the inner nozzle. Examples of this fluid include nitrogen and ethylene glycol.

As the polybenzimidazole polymer is spun it is fed into a coagulation bath, which bath comprises a solvent or solvent system which is a non-solvent for the polybenzimidazole polymer employed and preferably is a solvent for the dope solvent. Though the hollow filament can be spun directly into the coagulation bath, it is preferred to expose the spun fiber to a gas capable of effecting surface coagulation on the fiber. Generally this can be accomplished by spinning the fiber into air for usually not more than about 1 to 10 seconds, or in any case no longer than is required to coagulate a thin surface layer on the fiber. The preferred types of coagulation bath solvents include water, ethylene glycol and mixtures of these two, and aqueous N,N-dimethyl acetamide solutions. The speed at which the hollow filament is introduced into the coagulation bath can vary depending upon the length of the bath used. Generally speeds of about 2 to 50 meters per minute, preferably 5 to 20 meters per minute, are utilized with baths which are from one to ten meters, preferably 1 to 5 meters long. Thus exposure to the bath should be in the range of about 2 to 10 seconds or longer.

During the coagulation bath treatment step, the hollow filament material is preferably subject to a drawing operation. The purpose of this drawing operation is to decrease the size of the hollow filament, thereby increasing its surface area per unit volume, and its strength. Preferably the spun hollow filament material is drawn at a ratio between 1 and 20 to 1, most preferably between 5 and 15 to 1. The resulting filaments exhibit an inside diameter of about 12 microns to about 500 microns and an outside diameter of about 25 microns to about 1,000 microns, preferably 25 to 250 microns and 50 to 500 microns respectively.

Prior to use it is preferable that the drawn hollow filament material be subject to an annealing step using the techniques of commonly assigned U.S. Pat. No. 3,699,038, and as further described in U.S. Ser. No. 219,576, filed Jan. 20, 1972. Generally this annealing technique involves the exposure of the fiber for about 30 seconds to 20 minutes and at about 80° to 300°C. in an organic liquid, such as ethylene glycol, which is a non-solvent for the polybenzimidazole polymer and is preferably water miscible.

During any of the above steps the hollow filament when exposed to air should be kept moist so as not to impair the filament's reverse osmosis properties.

In preparing the hollow filament fibers of the instant invention it is important to recognize that the optimum reverse osmosis membranes are prepared from a plurality of parallel hollow fibers which fibers exhibit the minimum possible diameter, for as the diameter of the hollow fibers utilized decreases the surface area subject to the reverse osmosis processes necessarily is increased and there with it the rate of reverse osmosis. It is further desirable to have the maximum possible inside diameter in order to increase the inside surface area of reverse osmosis hollow filament membranes. Thus the optimum hollow filament fibers would be those of the smallest diameter having the thinnest possible walls. Bundles of the fibers or hollow filaments containing the desired number of fibers are prepared by applying an adhesive to each end of the group of prearranged parallel fibers. The bundled fibers are then preferably inserted into an elongated fluid-tight tubular casing assembly formed of a suitable material such as steel. Each end of the bundled fibers communicates to the outside of the casing while at either end of the casing a means for sealing each end of the fiber bundle to the ends of the casing is provided. The tubular casing is further provided with valves which open into the interior of the casing and to the outer surface of each of the fibers in the bundle, so as to provide a means for circulating the liquid to be purified about the hollow fibers. Although the fiber bundle should be packed as tightly as possible, it should be packed loosely enough to allow a liquid to pass between the individual fibers and effectively surround each hollow filament. Rather than utilizing a dual-ended tubular casing in which both

Example XI

The procedure described in Example IV was repeated except that the annealing step was eliminated.

In actual operation, water or the desired liquid is pumped into the casing to surround the exterior walls of the fibers in the bundle. The pressure can range from slightly above ambient to about 5,000 psi, preferably 600 to 3,000 psi. In the case of salt water substantially salt free water (depending of course on the feed concentration) accumulates on the inside of the fibers and flows in either direction along the hollow filaments to the exit. Using the above procedure it is possible to prepare as much as 2 to 25 gallons of water or more per square foot of hollow fil membrane outside surface area per day at pressures up to 5,000 psi.

The polybenzimidazole membranes of the present invention, once positioned upon a conventional porous support such as a porous steel plate, or arranged in hollow fil bundle, may be utilized to separate components of a solution by a variety of techniques, including among others reverse osmosis and ultrafiltration. For instance, the membranes of the present invention may be used to good advantage in those use areas where cellulose acetate separatory membranes have been used heretofore. However, because of the increased thermal and chemical stability exhibited by the polybenzimidazole membranes, a greater range of operating conditions, (e.g., temperatures) may be employed. The theory whereby the membranes of the present invention function to selectively isolate components of a solution via reverse osmosis is considered complex and presently incapable of simple explanation. Representative separations which may be accomplished through the use of the polybenzimidazole membranes are as follows: sodium chloride from aqueous solutions of the same, inorganic or higher molecular weight organic salts and molecules from aqueous solutions of the same, inorganic or low molecular weight organic acids, etc.

The hollow fibers as prepared above can be assembled for use in a water purification or permeator as described in U.S. Pat. No. 3,339,341, and as further described in U.S. Pat. No. 3,567,632.

Generally these permeators comprise in combination a fluid-tight casing assembled about a plurality of substantially parallel hollow fibers prepared from the polybenzimidazole polymers of the instant invention. The casing is provided with an inlet means for directing feed fluid (the fluid upon which the reverse osmosis operation is to act upon) over that portion of the exterior surface of the hollow fibers exposed in the interior of the casing. The casing is also provided with an exit means for selecting and removing a fluid which has been subject to the reverse osmosis process (in the case of salt water, desalinized water). Of course the feed fluid may also be directed into the interior of said hollow filaments in which case the fluid which has been subject to reverse osmosis is removed from the exterior surface of said hollow filaments.

When reverse osmosis membranes products or processes are referred to herein, it is of course understood that the liquid mixture or solution which is to be separated may be contacted with either one side or the other of the membranes or alternately with first one side and then the other side of the membrane. In either case on the other side of the membrane from the side of initial contact there is recovered liquid which contains a reduced amount of one component of the mixture or solution.

The polybenzimidazole membranes of the present invention are particularly suited for use in desalination operations in which the presence of sodium and chloride ions is diminished in aqueous solutions of the same by reverse osmosis. Once positioned on a conventional porous support, or arranged in hollow fil bundles, the membrane is in effect placed within a conventional reverse osmosis chamber with a solution of lesser salt concentration, (e.g., pure water) positioned on one side of the membrane and a solution of greater salt concentration on the opposite side. A pressure is exerted on the solution of greater salt concentration which exceeds the natural osmotic pressure and water of a lesser salt concentration is continuously withdrawn on the opposite low pressure side of the membrane. Additional salt water is continuously added to the high pressure side of the membrane and subject to pressure. In a preferred embodiment of the subject invention, the salt water on the high pressure side of the membrane is continuously circulated over the membranes. In this way, concentrated salt water may be withdrawn and disposed of, continuously or periodically, thereby minimizing the osmotic pressure which must be overcome to effect the separation.

The free energy of the solvent (i.e., water) in an aqueous sodium chloride solution is less than the free energy of the solvent in the pure state. There results, therefore, a spontaneous tendency for the solvent to move from the relatively high free-energy state of the pure solvent to the relatively low free-energy state of the solution. This tendency can be balanced by increasing the free-energy of the solution by subjecting it to an externally applied pressure. Mathematical derivations to determine the quantitative value of the pressure differential can be found in most physical chemistry texts.

The following examples are given as specific illustrations of the invention. It should be understood, however, that the invention is not limited to the specific details set forth in the examples.

Examples I – III

A solution having a viscosity of 400 poises at 30°C. was prepared employing N,N-dimethyl acetamide as solvent containing 15 percent by weight poly-2,2'-(m-phenylene)-5,5'-bibenzimidazole based upon the total weight of the solution, and 2 percent by weight lithium chloride based upon the total weight of the solution. The dissolution of the polymer was accomplished by agitating the same while in particulate form with the N,N-dimethyl acetamide solvent (in which the lithium chloride was previously dissolved) while in a closed zone at a temperature of about 230°C. The resulting solution was next filtered to remove any residual solids.

Quantities of the solution while at ambient temperature (i.e., 25°C.) were poured onto level smooth glass supports having upright edges extending above the surface to a uniform height of 4 mils (Examples II and III) or or 8 mils (Example I) as indicated in the Table. A doctor blade was passed over the surface of the solutions at a rate of about 20 inches per minute while resting upon the upright edges of the glass supports to insure that wet films of uniform thickness were positioned upon the supports.

Next a stream of air at ambient temperature (i.e., 25°C.) was caused to impinge upon the exposed surends are open to allow the escape of collected fluids, it is possible to utilize a permeator in which hollow filament bundles have been formed into a loop so that the ends of each of the filaments both exit through the same opening in the tubular casing. It is also of course possible to operate bundles of hollow fibers as reverse osmosis membranes when one end of the bundle has been blocked off.

faces of the wet films at a velocity of about 2 feet per second. As indicated in the following Table, the wet films were exposed to the stream of air for either 5 minutes (Example II) or 15 minutes (Examples I and III). During this period N,N-dimethyl acetamide solvent was evaporated from the exposed surfaces of the films thereby forming a relatively thin dense solid layer on the surfaces thereof. The remaining portions of wet films were of substantially lesser density than the solid layers formed upon the exposed surfaces.

The resulting films while still present upon the smooth glass supports were immersed in a vessel of cool water having a temperature of about 12°C. While immersed in water, residual quantities of N,N-dimethyl acetamide were essentially completely removed from the films and the remaining polybenzimidazole polymer situated beneath the thin surface layers was coagulated to a solid porous consistency. The reverse osmosis membranes formed upon the removal of residual solvent had thicknesses of approximately 8 mils in Example I and of approximately 4 mils in Examples II and III.

The resulting membranes were next utilized in the desalination of 0.5 percent by weight aqueous sodium chloride solutions provided at 25°C. by reverse osmosis. The membranes were kept moist from the time of their formation to the time of their utilization in the reverse osmosis separation. Each membrane was stripped from the smooth glass support and positioned upon a filter paper and a porous sintered metal plate which served to support the same during desalination. Each membrane, together with its porous support, was positioned within a conventional reverse osmosis apparatus of the flat plate type with the sodium chloride solution circulating on one side of the membrane and pure water being withdrawn on the opposite side of the membrane. The more dense surface of the polybenzimidazole membrane was exposed and faced the aqueous sodium chloride solution. A pressure of 600 pounds per square inch was applied to the sodium chloride solution.

The rejection value is a relative measure of the ability of the membrane to retard passage of the component being separated from the solution usually expressed as a weight percentage of the total.

Flux refers to the amount of fluid passing through the membrane per unit time and is generally expressed as gallons/ft.$^2$/day.

As indicated in the Table, flux rates of 1.8 to 14.5 gallons per square foot per day and rejection rates of 53 to 95 percent were observed for the Examples.

Table

| Example No. | Wet Film Thickness | Solvent Evaporation Time | Flux | Percent Rejection |
|---|---|---|---|---|
| I | 8 mils | 15 min. | 1.8 | 93 |
| II | 4 mils | 5 min. | 14.5 | 53 |
| III | 4 mils | 15 min. | 1.9 | 95 |

Examples IV – IX

The polybenzimidazole polymer solution described in Example I was placed in a spinning bomb and spun through a sheath-core spinning jet at ambient temperatures. The jet which was used had an outside diameter of about 0.036 inch and an inside diameter of about 0.029 inch. The polybenzimidazole polymer was spun through the outer ring of the jet nozzle while nitrogen was forced through the inner ring of the nozzle. As the polymer was spun through the outer ring, it was fed into a coagulation bath formed of water. During exposure to the bath which lasted about five seconds the hollow filament was drawn to a drawdown ratio of about 5 to 1. After exposure to the bath the hollow fil fiber was fed into an ethylene glycol annealing bath maintained at about 175°C. After about 10 minutes' exposure to the bath, the resulting hollow fil fiber exhibited a wall thickness of about 30 to 40 microns, an overall diameter of about 150 microns, and a tensile strength of about $1.25 \times 10^3$ psi.

The above fiber was then cut into 2 foot lengths and about 100 of these filaments were glued together near each end and placed inside a sealed pipe. The glued ends were attached to each end of the pipe to form a liquid tight seal between the inside of the pipe and the outside of the pipe. The pipe itself was equipped with two valves located near each end of the pipe which valves communicated with the inside of the pipe and thus the outside surface of each of the fibers in the bundle. Using the above apparatus desalinized water was prepared by pumping salt-containing water through the interior of the above apparatus under the desired pressure and collecting salt-reduced water at either end of the pipe.

Six desalination apparatus were constructed and operated at the following water pressures with the following results. Test pressure refers to the pressure at which water was introduced into the interor of the desalination apparatus. Flux refers to the flow rate of desalinized water in gallons per sq. ft. of hollow fil fiber outside surface area per day. Rejection refers to the percent of salt in the introduced salt water that is removed. In all instances 0.5 weight percent salt water solutions were used, with the following results:

| Example No. | Test Pressure (psi) | Flux (GFD) | Rejection Percentage |
|---|---|---|---|
| IV | 200 | 1.25 | 77.0 |
| V | 200 | 0.66 | 94.4 |
| VI | 400 | 1.6 | 95.2 |
| VII | 500 | 1.7 | 98.7 |
| VIII | 400 | 1.2 | 98.4 |
| IX | 600 | 1.4 | 99.1 |

Example X

Using the same procedure as described in Examples IV through IX above, a similar desalination unit was prepared utilizing DuPont's Permasep (aliphatic polyamide) fibers. Moisture regain for fibers prepared from a similar nylon was measured and found at 70°F. and 65 percent relative humidity to be about 4.5 percent, compared to about 13 percent for polybenzimidazole polymer fibers of the compositions of Examples IV – IX. Utilizing this apparatus at 600 psi resulted in the preparation of desalinized water at a rate of about 0.15 GFD with 53 percent of the initial salt concentration removed.

The desalination unit prepared from these hollow filaments exhibited at a test pressure of 200 psi a flux of 0.84 GFD and a salt rejection rate of 25 percent.

Example XII

Two desalination units, one similar to that utilized in Example IX and a second similar to that utilized in Example X were constructed. Both units were operated at input pressures of 600 psi for 3 months with the following results:

| Membrane Type | Time | Flow Rate (GFD) | Percent Salt Rejection (0.05 weight percent saline solution) |
|---|---|---|---|
| Example IX | -0- | 2.5 | 98.0 |
| Example IX | 3 mos. | 2.0 | 96.7 |
| Example X | -0- | 2.0 | 96.0 |
| Example X | 15 days | 1.24 | 70.0 |
| Example X | 3 mos. | 1.2 | 70.0 |

Similar tests were carried out with the same type of membranes at 400 psi.

| Membrane Type | Time | Flow Rate (GFD) | Percent Salt Rejection (0.05 weight percent saline solution) |
|---|---|---|---|
| Example IX | -0- | 1.3 | 98.00 |
| Example IX | 15 days | 1.2 | 98.00 |
| Example X | -0- | 1.3 | 90.00 |
| Example X | 15 days | 1.0 | 70.00 |

Thus, whether 400 psi or 600 psi is chosen as the operating pressure it is readily seen that polybenzimidazole reverse osmosis hollow filament membranes of the present invention exhibit far superior flow rates, rejection percentages and durability (strength) over similar membranes prepared from amide-linked polymers such as those disclosed in U.S. Pat. No. 3,567,632.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A process for producing an improved reverse osmosis membrane of unusually high physical durability and chemical stability comprising:

a. providing a solution of a polybenzimidazole polymer consisting essentially of recurring units of the formula:

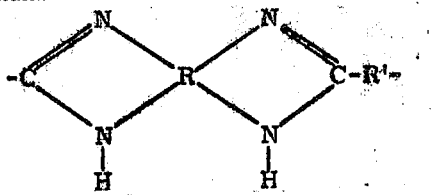

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran, in a solvent capable of dissolving said polymer, b. depositing a film of said solution upon a support, c. evaporating an amount of solvent from said film sufficient to allow the formation of a thin solid layer on the exposed surface of said film having a density which is substantially greater than that of the remaining portion of said film on which said solid layer of increased density is formed, and d. washing the resulting film with a non-solvent for said polymer to remove residual solvent thereby producing a semipermeable membrane suitable for a reverse osmosis separation.

2. A process according to claim 1 wherein said polybenzimidazole polymer is poly-2,2'-(m-phenylene)-5,5'-bibenzimidazole.

3. A process according to claim 1 wherein said solvent capable of dissolving said polymer is selected from the group consisting of N,N-dimethyl acetamide, N,N-dimethyl formamide, dimethyl sulfoxide and N-methyl-2-pyrrolidone.

4. A process according to claim 1 wherein said solvent is N,N-dimethyl acetamide.

5. A process according to claim 4 wherein said polybenzimidazole polymer is present in said solvent in a concentration of about 5 to 30 percent by weight based upon the total weight of the solution.

6. A process according to claim 1 wherein said film is deposited on said support in a thickness of about 1 to 30 mils.

7. A process according to claim 1 wherein said thin solid layer formed upon the surface of said film by the evaporation of said solvent has a thickness of about 0.01 to 20 microns.

8. A process according to claim 1 wherein said resulting film is washed in water to remove residual solvent and thereby produce a reverse osmosis membrane.

9. A process according to claim 8 wherein said water is present at a temperature of about 5° to 30°C.

10. A process for producing an improved reverse osmosis membrane of unusually high physical durability and chemical stability comprising:

a. providing a solution of polybenzimidazole polymer consisting essentially of recurring units of the formula:

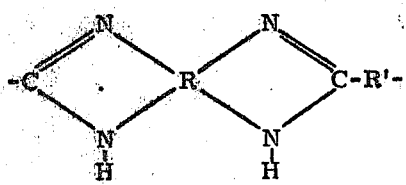

wherein R is a tetravalent aromatic nucleus, with the nitrogen atoms forming the benzimidazole rings paired upon adjacent carbon atoms of said aromatic nucleus, and R' is selected from the group consisting of (a) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran, in a solvent selected from the group consisting of N,N-dimethyl acetamide, N,N-dimethyl formamide, dimethyl sulfoxide and N-methyl-2-pyrrolidone with said polymer being present in a concentration of about 5 to 30 percent by weight based upon the total weight of the solution, b. depositing a film of said solution upon a support in a thickness of about 1 to 30 mils, c. evaporating an amount of said solvent from said film sufficient to allow the formation of a thin solid layer having a thickness of about 0.1 to 5 microns on the exposed surface of said film having a density which is substantially greater than that of the remaining portion of said film on which said solid layer of increased density is formed, and d. washing the resulting film with water to remove residual solvent thereby producing a semipermeable membrane suitable for a reverse osmosis separation.

11. A process according to claim 10 wherein said polybenzimidazole polymer is poly-2,2'-(m-phenylene)-5,5'-bibenzimidazole.

12. A process according to claim 10 wherein said solvent is N,N-dimethyl acetamide.

13. A process according to claim 10 wherein said resulting film is washed with water having a temperature of about 5° to 30°C.

14. A process for producing an improved reverse osmosis membrane of unusually high physical durability and chemical stability suitable for use in a desalination separation comprising:

a. providing a solution of poly-2,2'-(m-phenylene)-5,5'-bibenzimidazole in N,N-dimethyl acetamide wherein said polymer is present in a concentration of about 10 to 20 percent by weight based upon the total weight of said solution, b. depositing a film of said solution upon a support in a thickness of about 2 to 10 mils, c. evaporating an amount of said N,N-dimethyl acetamide from said film sufficient to allow the formation of a thin solid layer having a thickness of about 0.1 to 5 microns on the exposed surface of said film having a density which is substantially greater than that of the remaining portion of said film on which said solid layer of increased density is formed, and d. washing the resulting film with water having a temperature of about 5° to 30°C. to remove residual solvent thereby producing a semipermeable membrane suitable for a reverse osmosis separation.

15. An improved reverse osmosis polybenzimidazole membrane of unusually high physical durability and chemical stability consisting essentially of recurring units of the formula:

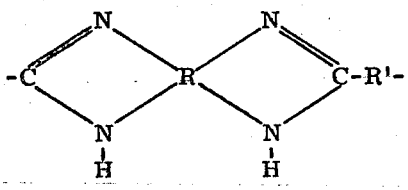

having an inherent viscosity in 97 percent sulfuric acid at 25°C. of at least about 0.4 wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

16. An improved reverse osmosis membrane in accordance with claim 15 consisting essentially of poly-2,2'-(m-phenylene)-5,5'-benzimidazole.

17. An improved reverse osmosis membrane in accordance with claim 15 wherein said membrane is a flat film.

18. An improved reverse osmosis membrane in accordance with claim 15 wherein said membrane is a hollow filament.

19. An improved reverse osmosis membrane in accordance with claim 18 wherein said filament has an outer diameter of about 25 to 1,000 microns, and an inner diameter of about 12 to 500 microns.

20. An improved reverse osmosis membrane of unusually high physical durability and chemical stability in the form of a flat film consisting essentially of poly-2,2'-(m-phenylene)-5,5'-bibenzimidazole having an inherent viscosity in 97 percent sulfuric acid at 25°C. of at least about 0.4.

21. An improved reverse osmosis membrane of unusually high physical durability and chemical stability in the form of a hollow filament consisting essentially of poly-2,2'-(m-phenylene)-5,5'-bibenzimidazole having an inherent viscosity in 97 percent sulfuric acid of at least about 0.5, an outer diameter of about 25 to 1,000 microns, and an inner diameter of about 12 to 500.

* * * * *